US009063306B2

(12) United States Patent
Little et al.

(10) Patent No.: US 9,063,306 B2
(45) Date of Patent: Jun. 23, 2015

(54) OPTO-ELECTRONIC DEVICE ASSEMBLY

(71) Applicant: HON HAI PRECISION INDUSTRY CO., LTD., New Taipei (TW)

(72) Inventors: Terrance F. Little, Fullerton, CA (US); Yuan-Chieh Lin, Lake Forest, CA (US); Jun-Bin Huang, Eastvale, CA (US); Jim Zhao, Irvine, CA (US); Gang Paul Chen, Walnut, CA (US); Jie Zheng, Rowland-Heights, CA (US); Ji Li, West Covina, CA (US); An-Jen Yang, Irvine, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 161 days.

(21) Appl. No.: 13/858,932

(22) Filed: Apr. 8, 2013

(65) Prior Publication Data

US 2013/0266274 A1 Oct. 10, 2013

Related U.S. Application Data

(60) Provisional application No. 61/621,559, filed on Apr. 8, 2012.

(51) Int. Cl.
*G02B 6/42* (2006.01)
*G02B 6/43* (2006.01)

(52) U.S. Cl.
CPC ............... *G02B 6/4269* (2013.01); *G02B 6/43* (2013.01); *G02B 6/428* (2013.01); *G02B 6/426* (2013.01); *G02B 6/423* (2013.01); *G02B 6/4243* (2013.01); *G02B 6/4249* (2013.01); *G02B 6/4284* (2013.01)

(58) Field of Classification Search
CPC ............................. G02B 6/4269; G02B 6/428
See application file for complete search history.

(56) References Cited

U.S. PATENT DOCUMENTS

| | | | |
|---|---|---|---|
| 5,337,388 A * | 8/1994 | Jacobowitz et al. ............ | 385/76 |
| 5,895,276 A | 4/1999 | Rothenberger | |
| 6,010,368 A * | 1/2000 | Tai ................. | 439/637 |
| 6,042,386 A | 3/2000 | Cohen | |
| 6,343,171 B1 | 1/2002 | Yoshimura | |
| 6,537,852 B2 * | 3/2003 | Cohn et al. .................... | 438/109 |
| 7,209,621 B2 | 4/2007 | Glebov | |
| 7,230,278 B2 * | 6/2007 | Yamada et al. ................. | 257/80 |
| 8,035,973 B2 | 10/2011 | McColloch | |
| 8,192,090 B2 * | 6/2012 | Benoliel ......................... | 385/53 |
| 8,277,129 B2 * | 10/2012 | Sabano et al. .................. | 385/83 |
| 8,331,752 B2 | 12/2012 | Biribuze et al. | |
| 8,348,516 B2 | 1/2013 | Roth | |
| 8,351,204 B2 * | 1/2013 | Yeo et al. ....................... | 361/695 |
| 8,475,195 B2 * | 7/2013 | Annis et al. ................... | 439/328 |
| 8,529,282 B1 * | 9/2013 | Westman et al. .............. | 439/345 |

(Continued)

*Primary Examiner* — Rhonda Peace
(74) *Attorney, Agent, or Firm* — Wei Te Chung; Ming Chieh Chang

(57) ABSTRACT

An object of the present invention is to provide a new modular SLC (Surface Laminar Circuit) interconnect system for replacing the traditional ceramic substrate implanted with 56 Duece modules, the interconnect system includes an organizer for accurately positioning the connector assemblies, and a plurality of fully populated connector housings defining a pitch same as that defined by the Duece modules. Each connector housing defines two receiving slots to receive two SLC modules which are further commonly held by a heat sink above. Each SLC module is equipped with a plurality of micro-controllers, a plurality of OE glass lenses, a plurality of IC chips, and a molded lens and fiber able assembly.

18 Claims, 27 Drawing Sheets

(56) References Cited

U.S. PATENT DOCUMENTS

| | | |
|---|---|---|
| 8,670,238 B2* | 3/2014 | Wang et al. .................... 361/716 |
| 8,861,975 B2* | 10/2014 | Pitwon et al. ................. 398/164 |
| 2003/0038297 A1* | 2/2003 | Carroll et al. ................... 257/99 |
| 2006/0210225 A1* | 9/2006 | Fujiwara et al. ................ 385/92 |
| 2006/0238991 A1* | 10/2006 | Drako ........................... 361/796 |
| 2007/0086723 A1* | 4/2007 | Sasaki et al. .................. 385/137 |
| 2008/0310799 A1 | 12/2008 | Jacobowitz |
| 2009/0253290 A1* | 10/2009 | Harris ........................... 439/377 |
| 2010/0049893 A1* | 2/2010 | Drako ........................... 710/301 |
| 2013/0108224 A1* | 5/2013 | Ishigami et al. ................ 385/89 |
| 2013/0266274 A1* | 10/2013 | Little et al. ...................... 385/89 |
| 2014/0056557 A1* | 2/2014 | Zhao et al. ...................... 385/33 |
| 2014/0185993 A1* | 7/2014 | Hung .............................. 385/89 |

* cited by examiner

US 9,063,306 B2

OPTO-ELECTRONIC DEVICE ASSEMBLY

BACKGROUND OF THE INVENTION

1. Field of the Invention

The present invention relates to opto-electronic (OE) device assemblies, and more specifically to integrating multiple OE modules with waveguide, e.g., Fiber or Polymer Waveguide (PWG), as an OE sub-assembly to further reduce user's installation and testing costs.

2. Description of Related Art

Most computer and communication networks today rely on copper wire to transmit data between nodes in the network. Since the data transmitted over the copper wire and the data processed within the nodes are both represented in the form of electrical signals, the transfer of data at the node-copper wire interface is straight forward. Other than perhaps level shifts and signal amplification, no other signal processing is required for data transmitted over the copper wire to be decoded by the node. The drawback with using copper wire is its relatively narrower bandwidth. Copper's ability to transmit data is significantly limited compared to other mediums, such as fiber optics. Accordingly much of the computer and communication networks built today, including the Internet, are using fiber optic cable instead of copper wire.

With fiber optic cable, data is transmitted using light wave, rather than electrical signals. For example, a logical one (1) may be represented by a light pulse of a specific duration and a logical zero (0) may be represented by the absence of a light pulse for the same duration. In addition, it is also possible to transmit at the same time multiple colors of light over a single strand of optic fiber, with each color of light representing a distinct data stream. Since light is attenuated less in fiber than electrons traveling through copper, and multiple data streams can be transmitted at one time, the bandwidth of optic fiber is significantly greater than copper.

While fiber optic data transmission has proven very efficient, substantial problems have been encountered when applying these light signals to process data. Transferred data is typically stored in various locations before, during and after it is processed by a computer. Since there is currently no efficient technique to "store" these light packets of data, networks will likely continue to use fiber optics for transmitting data between nodes and silicon chips to process the data within the nodes for the foreseeable future. Building such networks requires opto-electronic transceivers, which connect optical transmission devices to electronic computing devices through devices that transform optical signals to electronic signals, and vice-versa.

Ideally, such opto-electronic transceivers should provide secured and reliable connections between the various devices and should be compact in size. Secured connections ensure that the individual devices do not disconnect and therefore cause a failure in the opto-electronic transformation process. Compactly sized transceiver modules allow a higher density of optical cables to be attached to an electronic printed circuit board, thereby increasing the bandwidth available to the computing system.

While the transceiver design adequately ensures a secure connection between optical and electronic devices, assembly of its individual sub-assemblies is mechanically complex.

In view of the foregoing, a simple and compact opto-electronic transceiver capable of providing secure connections between optical and electronic devices would be desirable. Specifically, this instant invention is to replace the current ceramic substrate which is implanted with 56 Duece modules thereon.

SUMMARY OF THE INVENTION

Accordingly, an object of the present invention is to provide a new modular SLC (Surface Laminar Circuit) interconnect system for replacing the traditional ceramic substrate implanted with 56 Duece modules. The interconnect system includes an organizer for accurately positioning the connector assemblies, and a plurality of fully populated connector housings defining a pitch same as that defined by the Duece modules. Each connector housing defines two receiving slots to receive two SLC modules which are further commonly held by a heat sink above. Each SLC module is equipped with a plurality of micro-controllers, a plurality of OE glass lenses, a plurality of IC chips, and a molded lens and fiber able assembly.

In brief, technically speaking the prior art is to install a plurality of OE module in a LGA socket which is for electrical interface. After the OE module converting the electrical signal into optical signal and vice versa, an optical connector with waveguide is to attach to the optical interface of OE module for optical signal transmission or receiving. Due to the active components of OE module which generates heat, a heat sink/spreader is required for heat dissipation. In the field, it is troublesome to install all those components, inspection, testing and field service. The invention is to put all those troublesome behind by organizing all those components in an Active Optical Cable (AOC) package. The user just plugs in the AOC into socket or unplug just like an ordinary cable assembly. An organizer is to allow a plurality of AOC to align with the socket to form a compact package in a dense area. It makes easy installation and field serviceable. Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
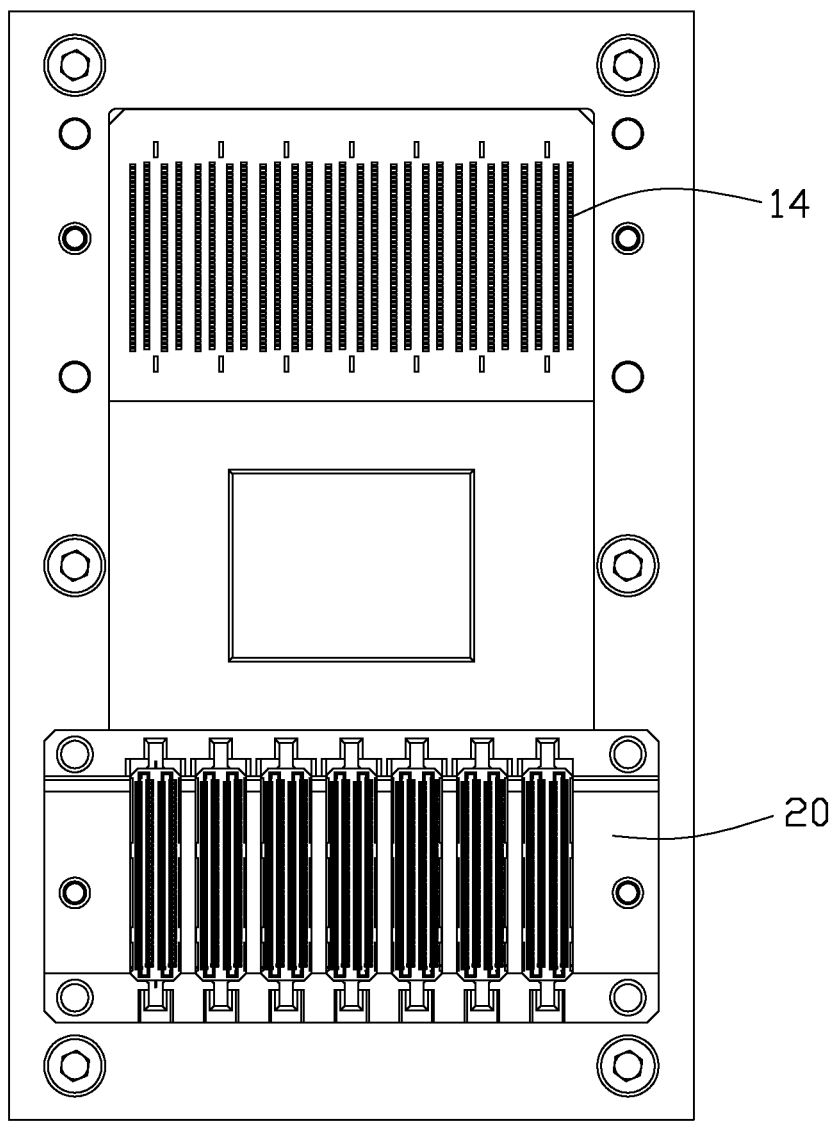
FIG. 1 is a top view showing the substrate of the present preferred embodiment of the instant invention wherein one side of the connectors are removed to show the area is same as that arranged for the conventional 4X7 OE module socket of the prior art.
Figure 2:
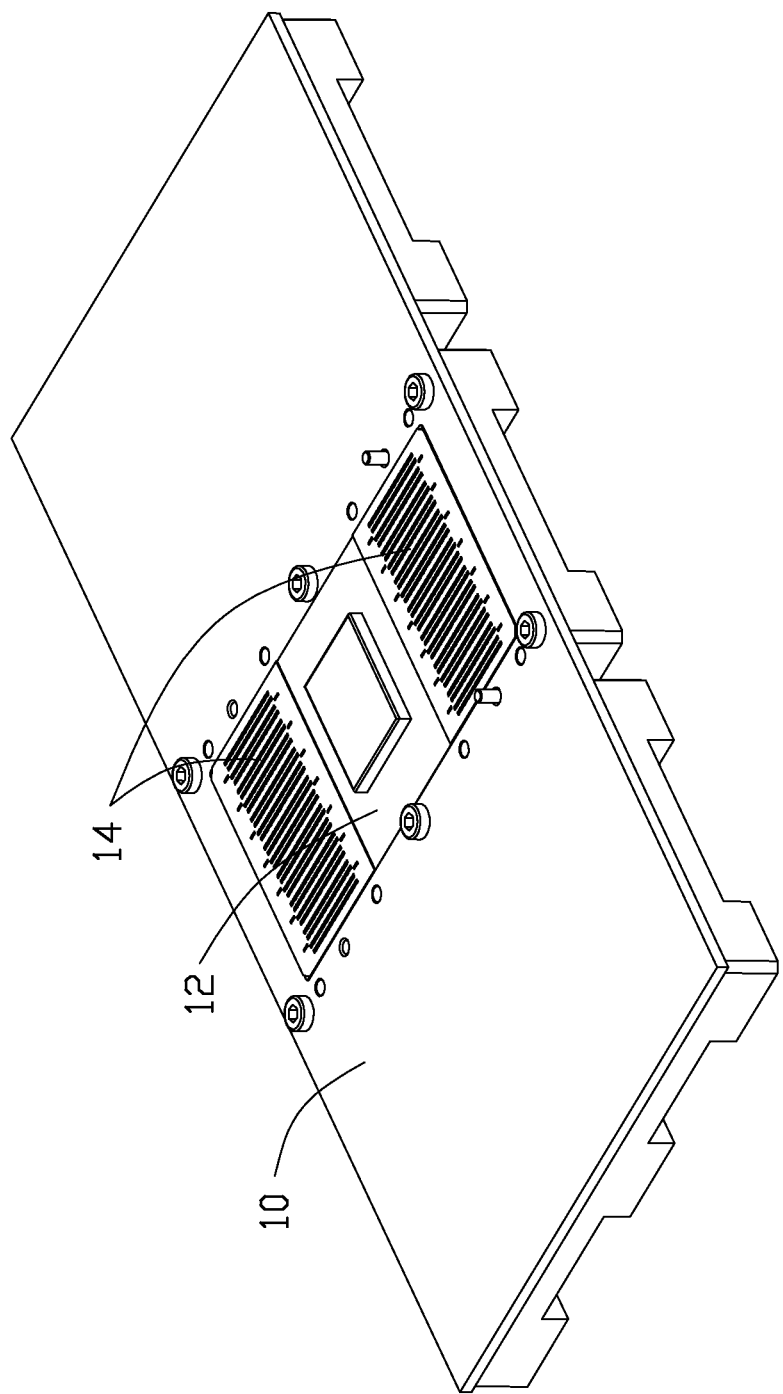
FIG. 2 is a perspective view of a frame with therein the substrate of the FIG. 2 while without the organizer and the connectors attached to the ceramic substrate.
Figure 3:
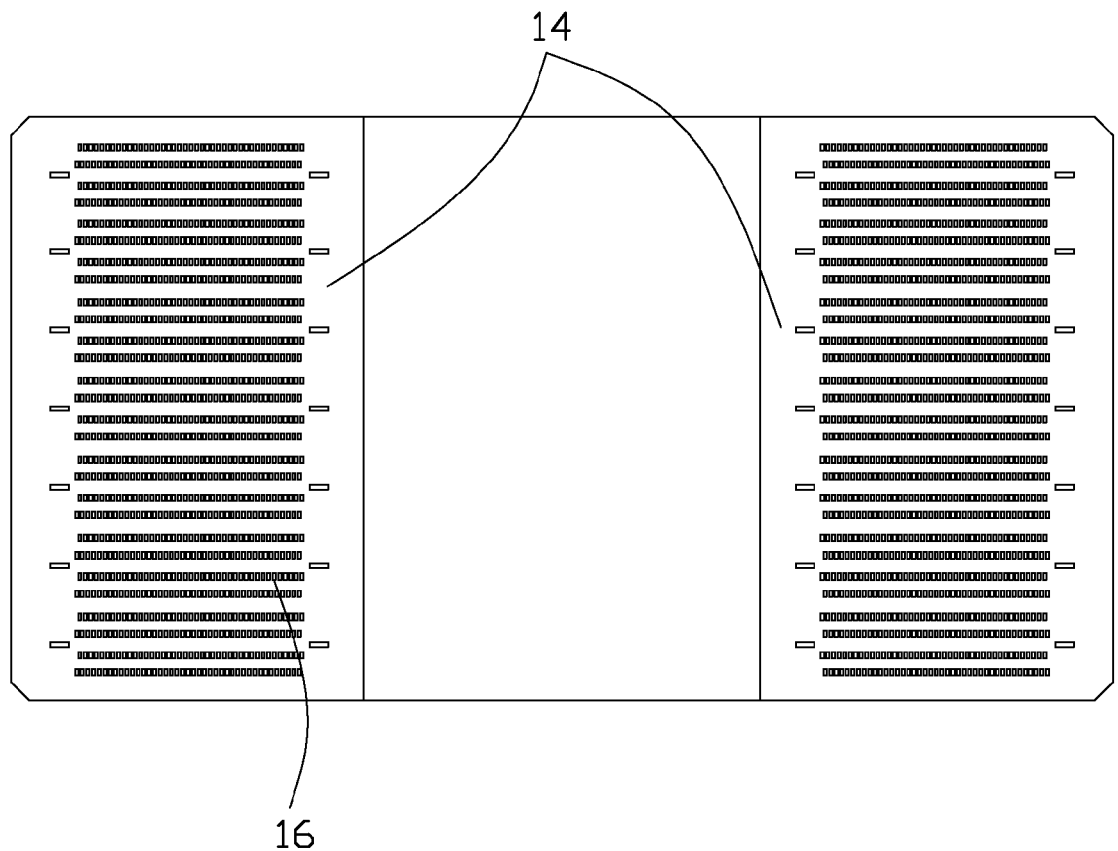
FIG. 3 is a top view of the substrate of FIG. 1 without the organizer and the connectors attaché thereto.
Figure 4:
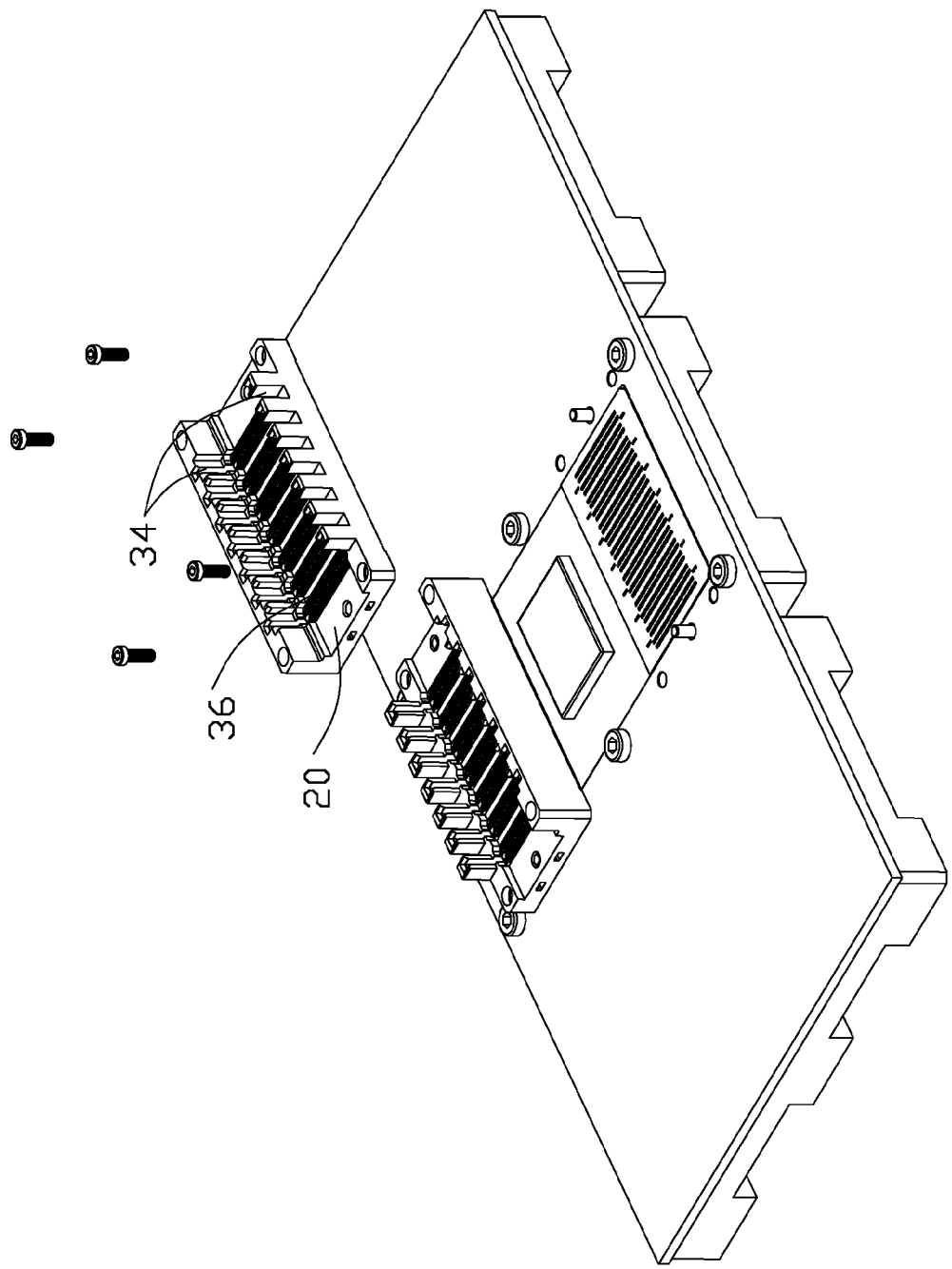
FIG. 4 is a partial perspective view of FIG. 2 to show how the organizer is ready to be assembled to the base.
Figure 5:
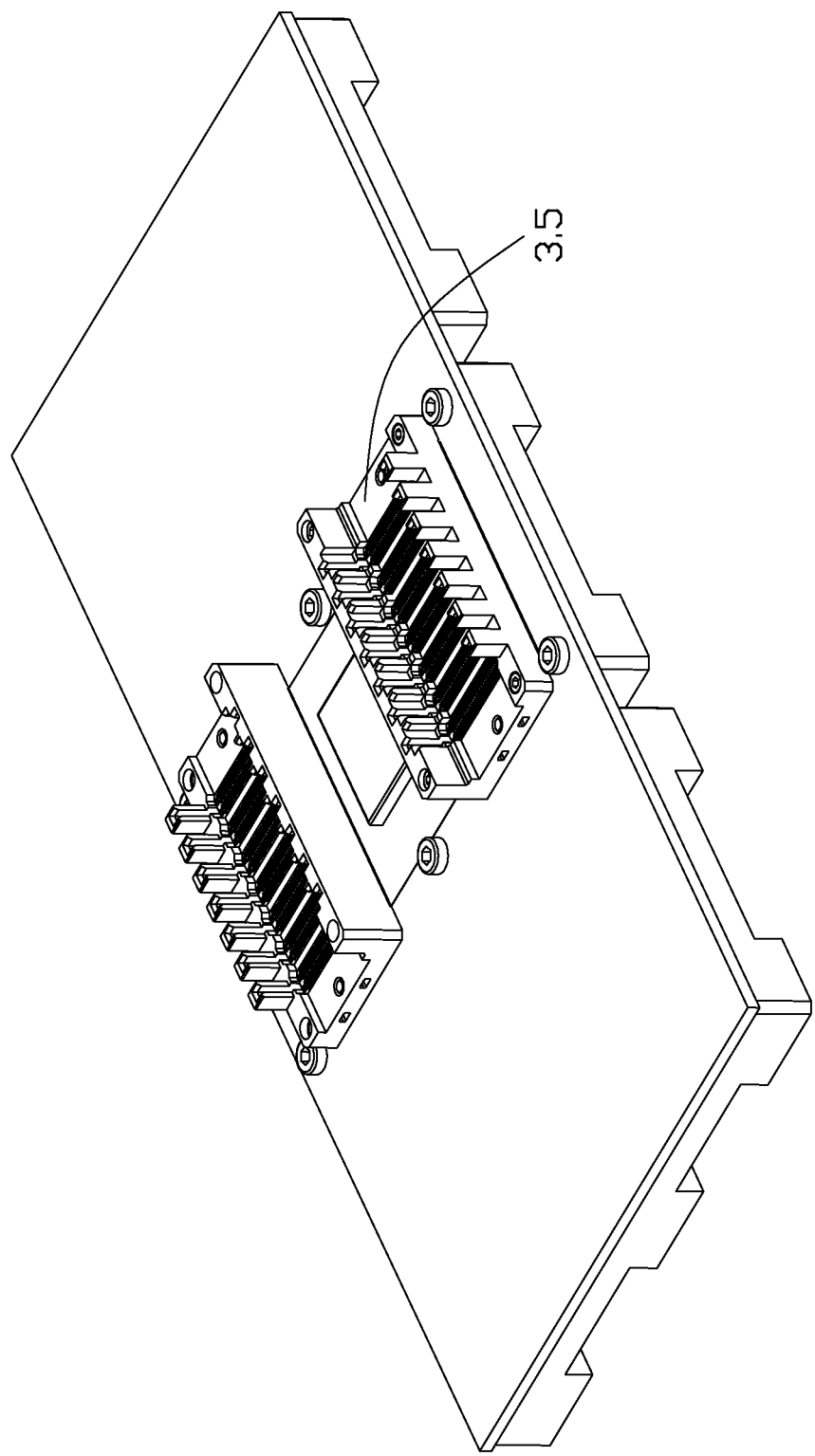
FIG. 5 is a partial perspective view of FIG. 4 to show the organizer is assembled to the base so as to have the associated connectors electrically and mechanically connected to the ceramic substrate.
Figure 6:
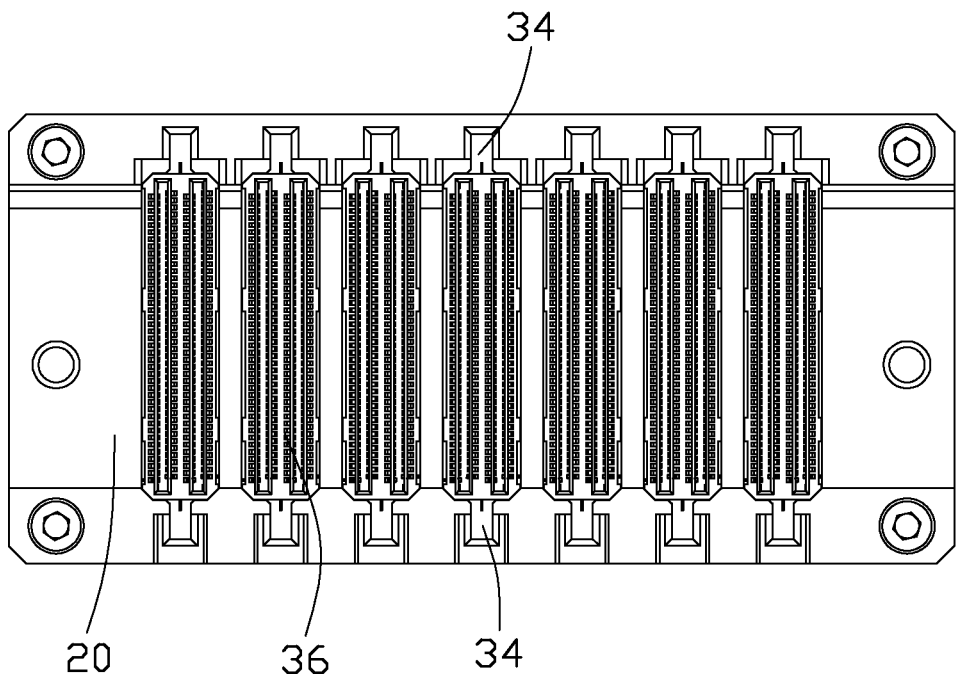
FIG. 6 is a top view to show the organizer with the connectors therein.
Figure 7:
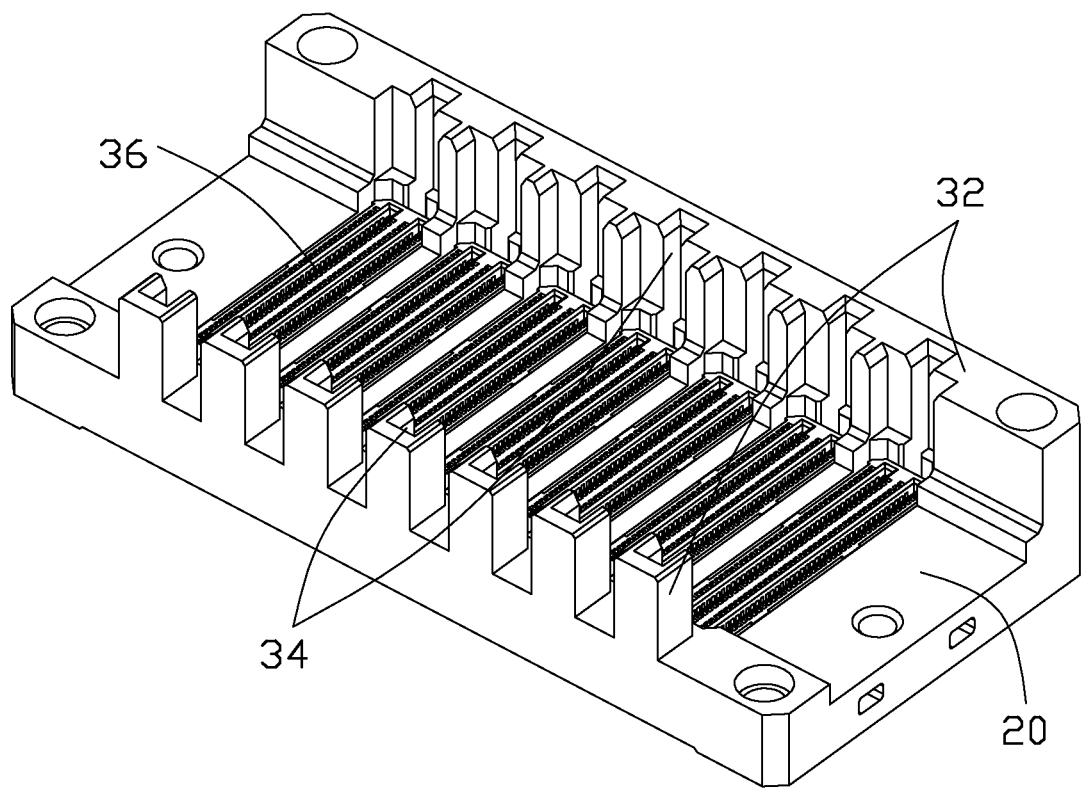
FIG. 7 is a perspective view to show the organizer with the connectors therein.
Figure 8:
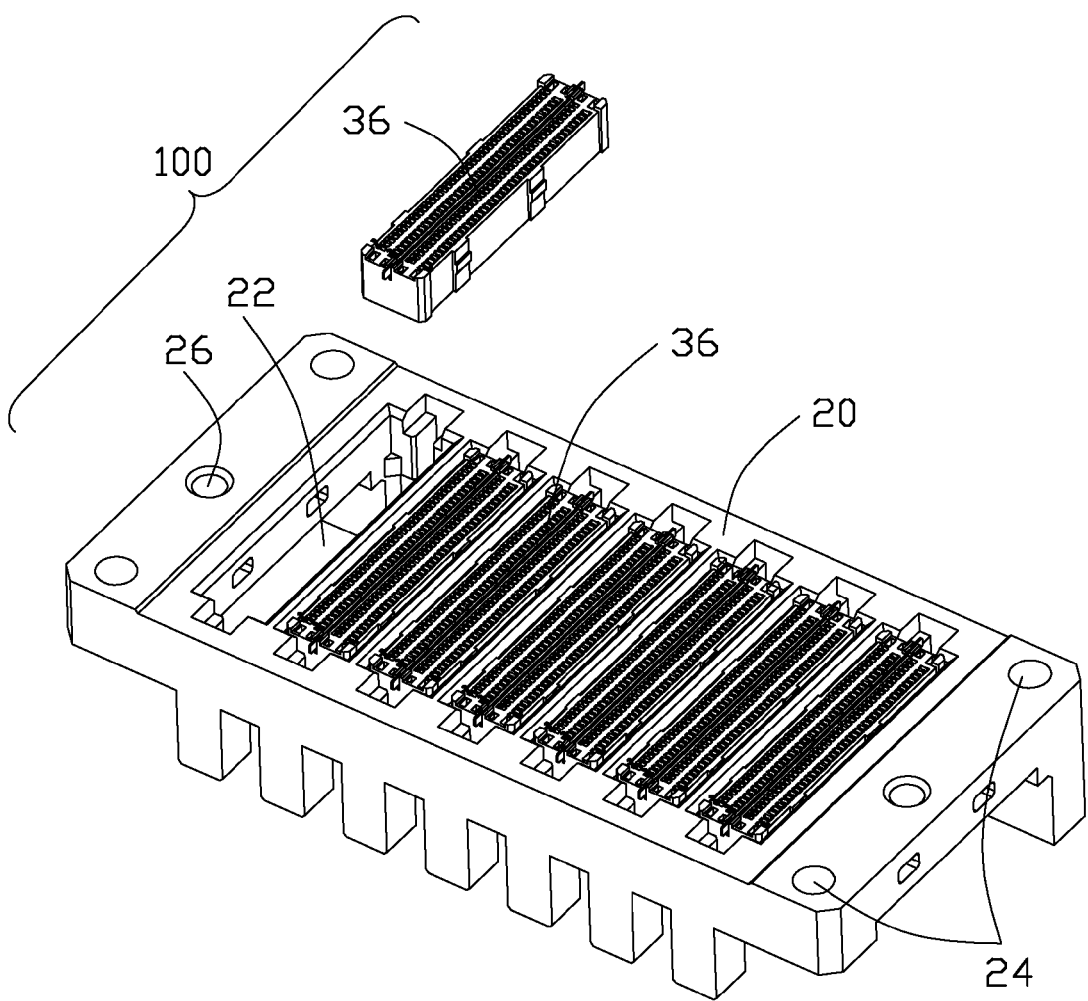
FIG. 8 is an upside down perspective view to show the assembling direction of the connector with regard to the organizer.
Figure 9:
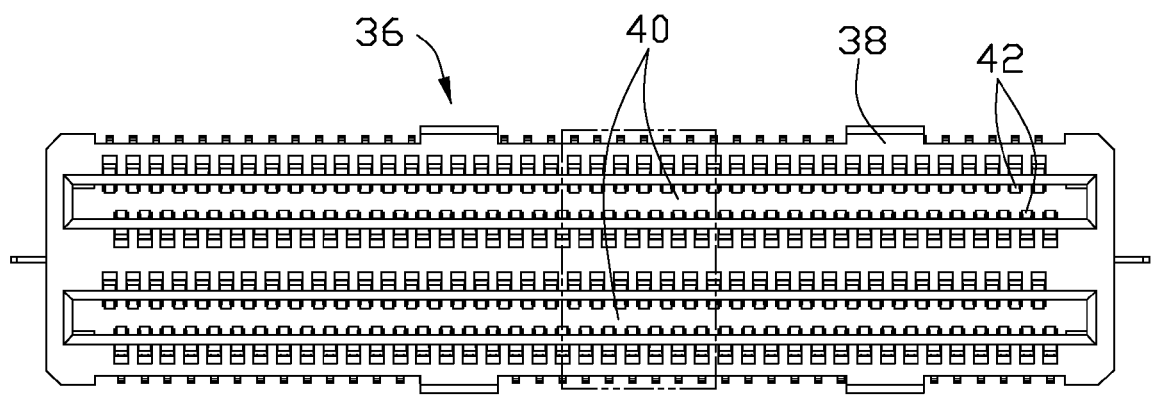
FIG. 9 is a top view of the connector to show two receiving slots therein.
Figure 10:
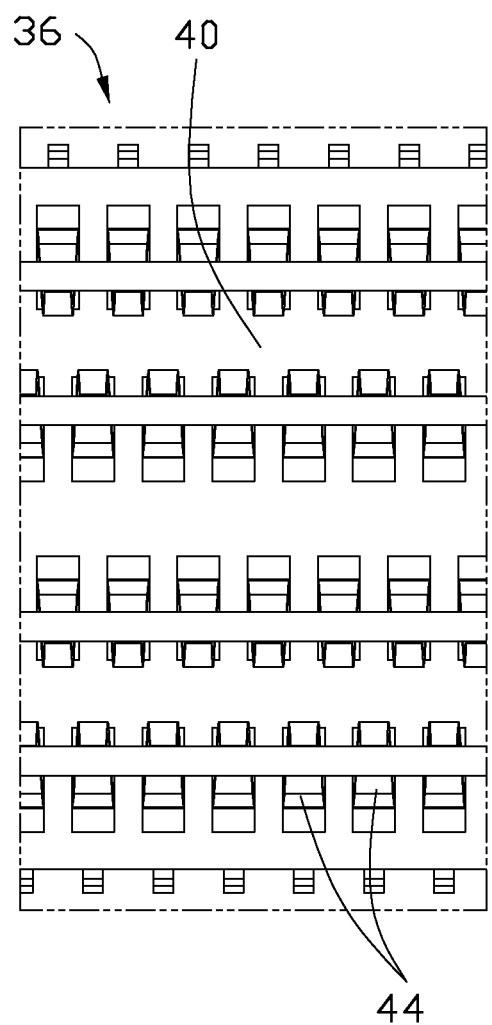
FIG. 10 is an enlarged partial view of FIG. 9 to show the staggered arrangement of the contacts by two sides of the corresponding receiving slot.
Figure 11:
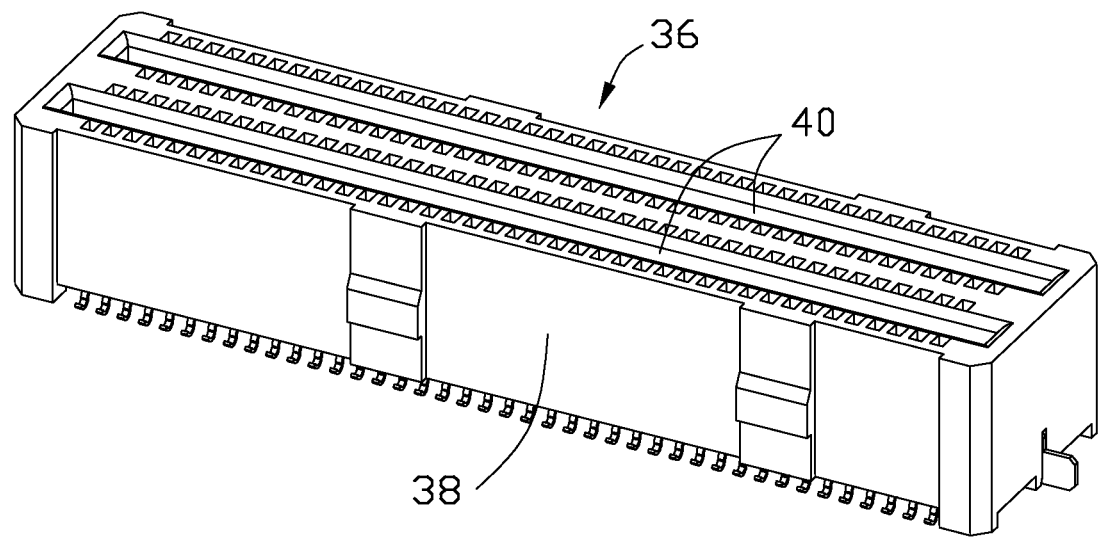
FIG. 11 is a perspective view of the connector.
Figure 12:
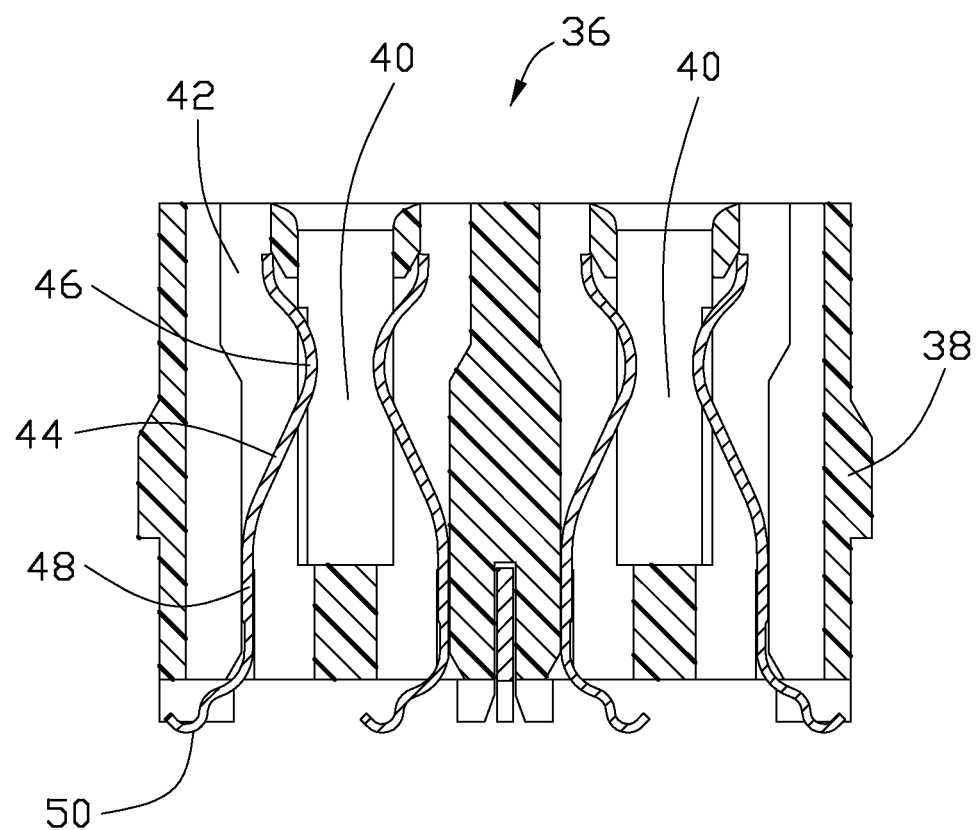
FIG. 12 is an illustrative elevational view to show the LGA type and paddle card type contact interfaces.
Figure 13:
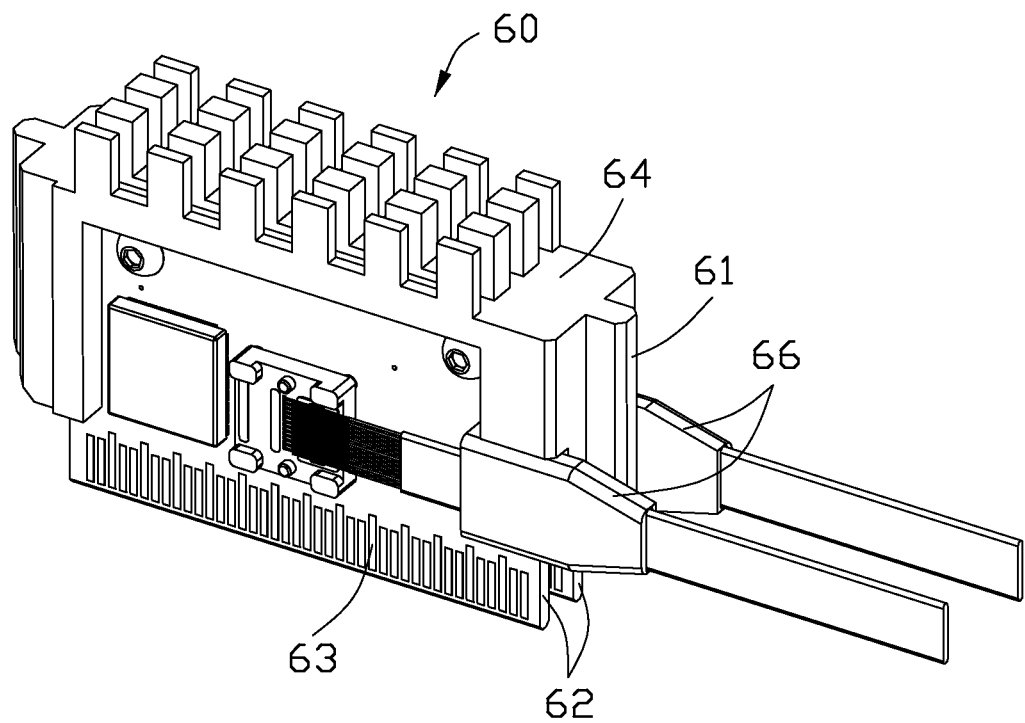
FIG. 13 is a perspective view to show the SLC or AOC assembly.
Figure 14:
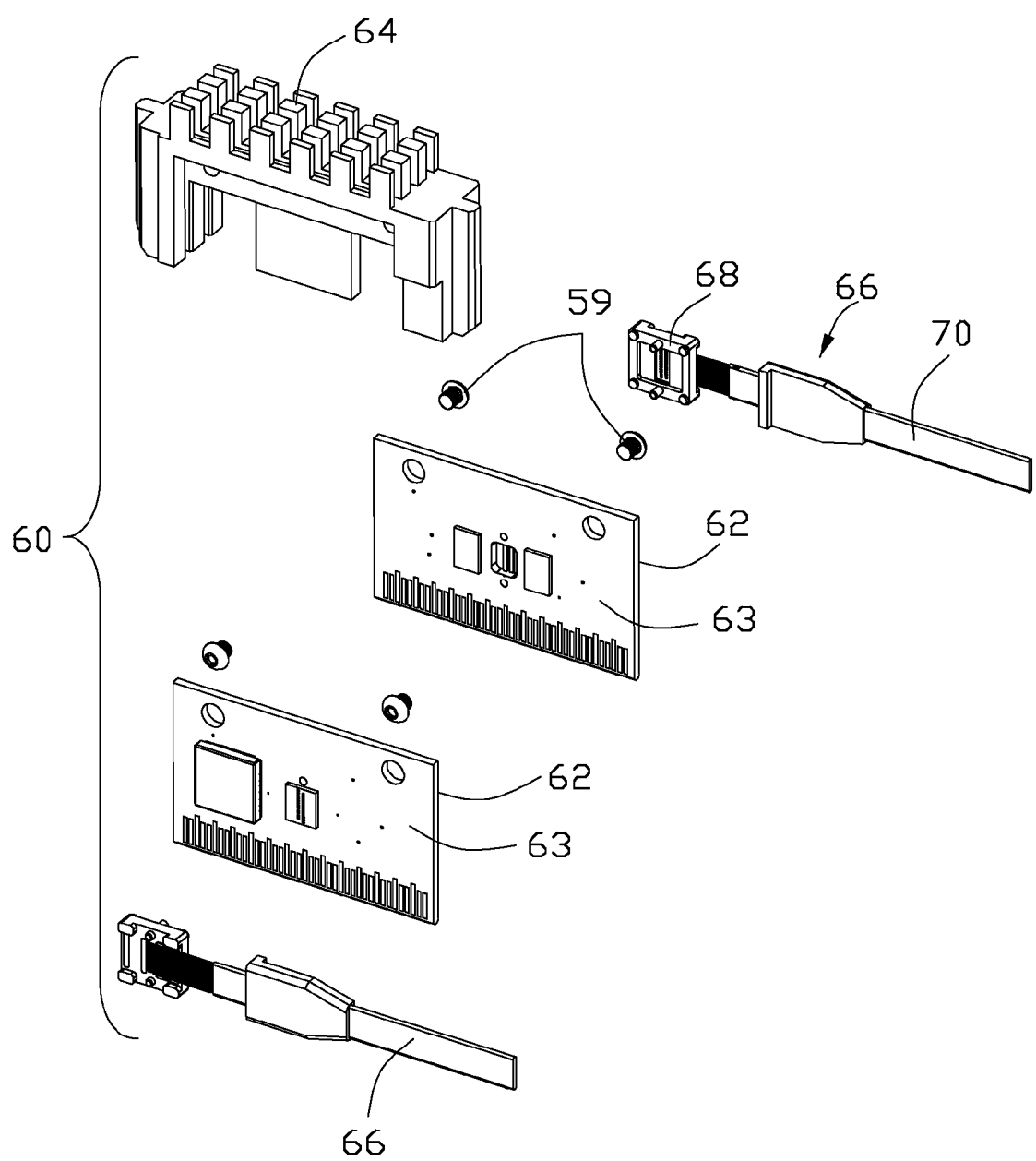
FIG. 14 is an exploded perspective view to show the SLC or AOC assembly.
Figure 15:
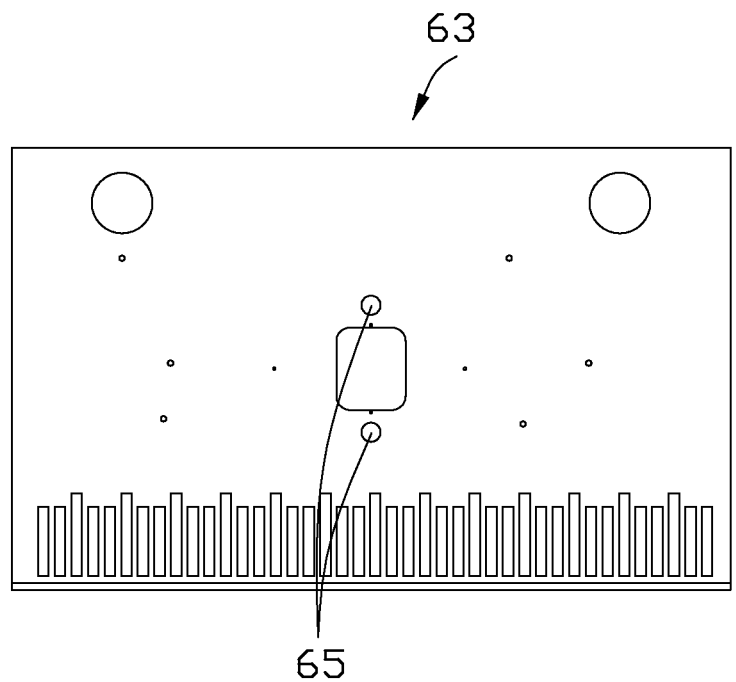
FIG. 15 is an elevational view to show the SLC.
Figure 16A:
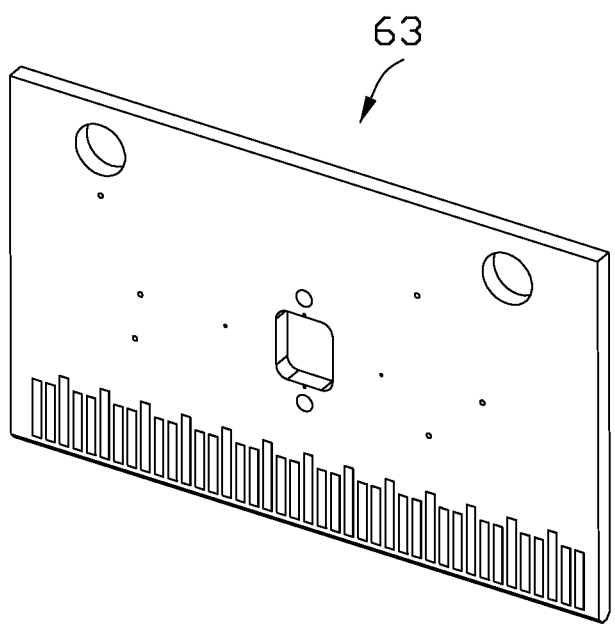
FIG. 16(A) is an elevational view to show one side of the SLC.
Figure 16B:
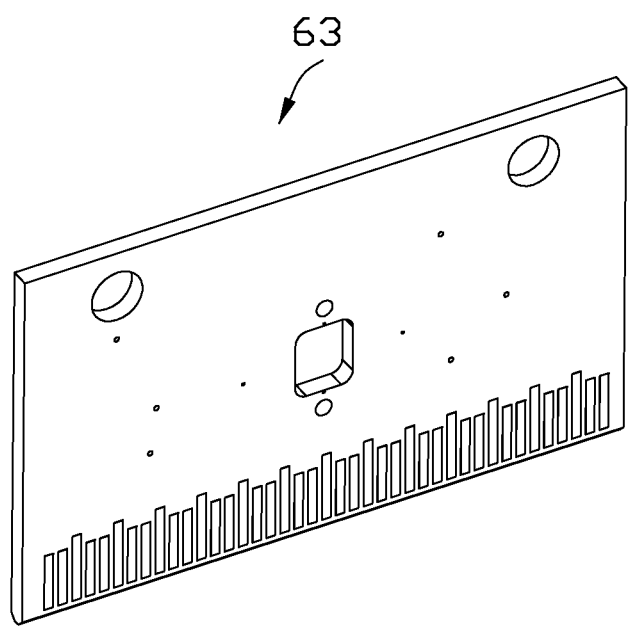
FIG. 16(B) is an elevational view to show the other side of the SLC
Figure 17:
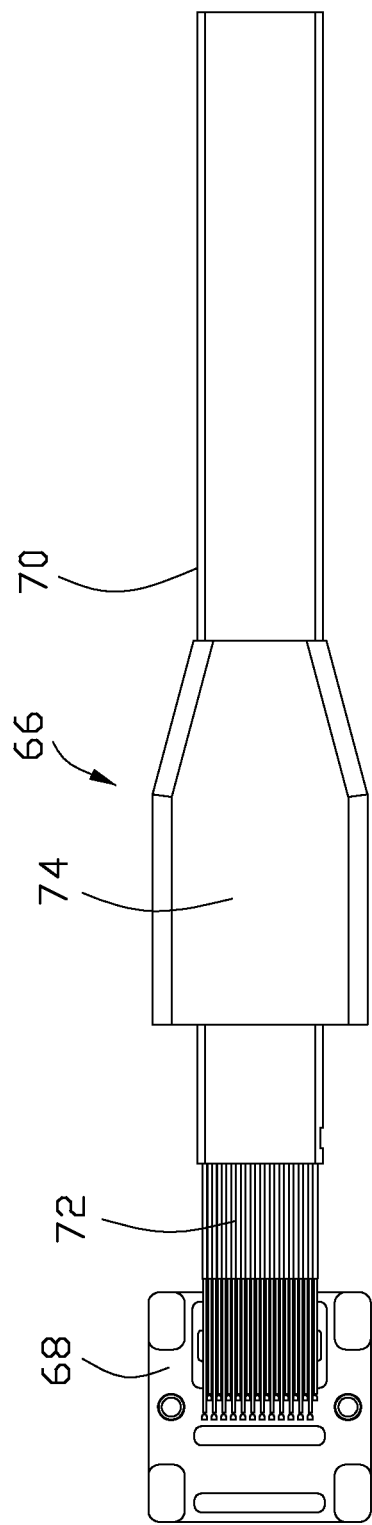
FIG. 17 is a top view to show the molded lens and fiber cable assembly.
Figure 18:
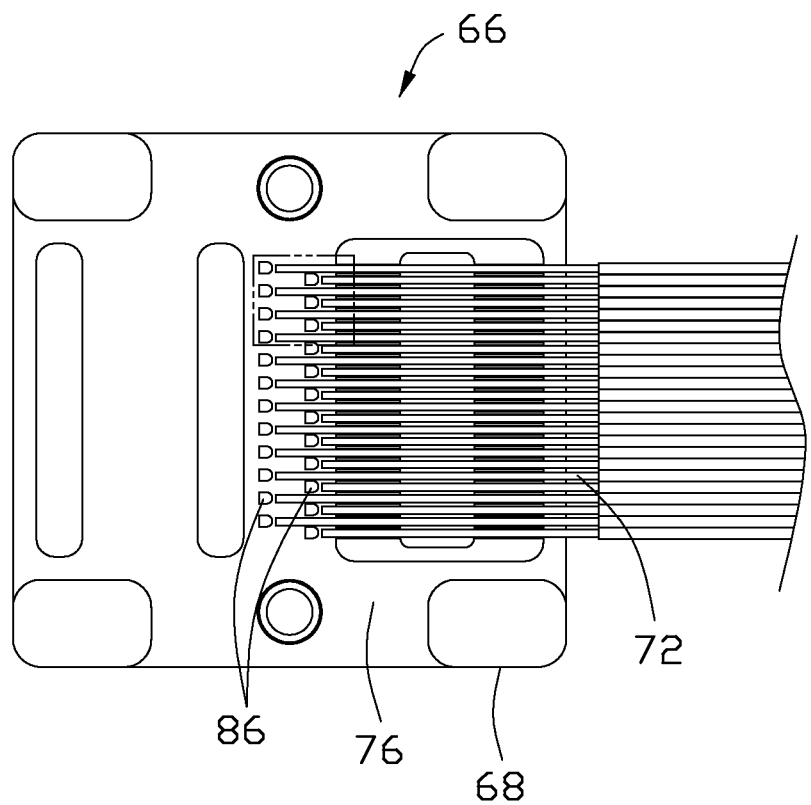
FIG. 18 is an enlarged top view of FIG. 17 to show the staggered fiber arrangement.
Figure 19:
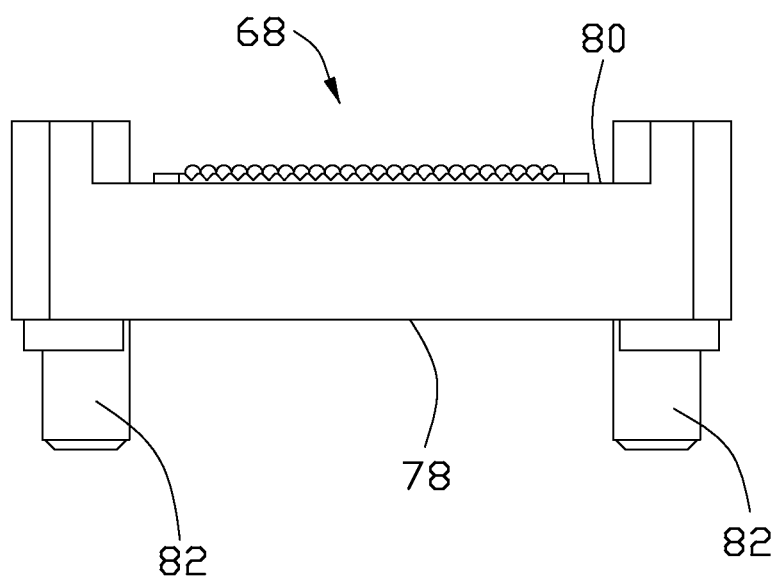
FIG. 19 is a side view of the molded lens to show the fibers are arranged in one row.
Figure 20:
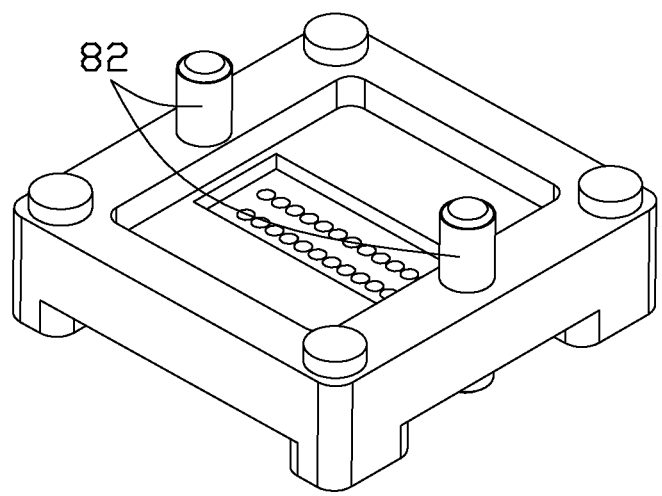
FIG. 20 is a perspective view to show the molded lens in different aspects.
Figure 20:
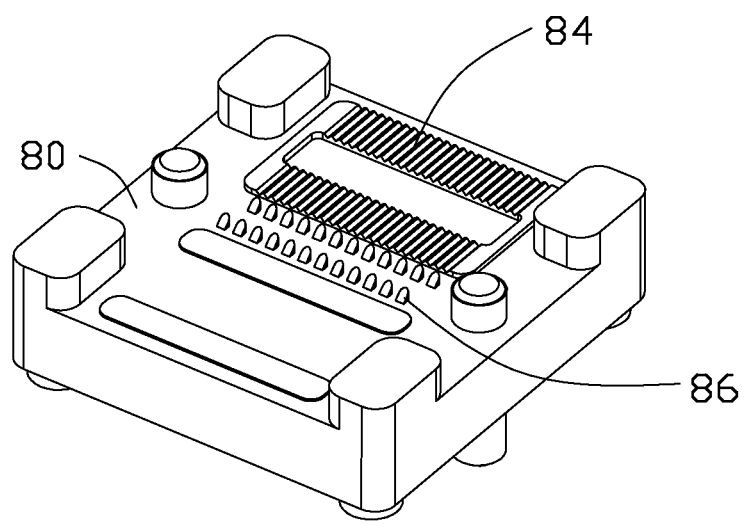
Figure 21A:
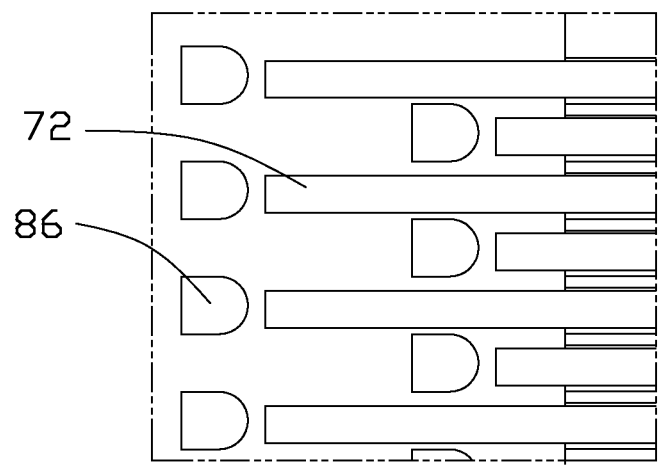
FIG. 21(A) is a top view to shown how the fibers and the corresponding lenses are aligned with each other.
Figure 21B:
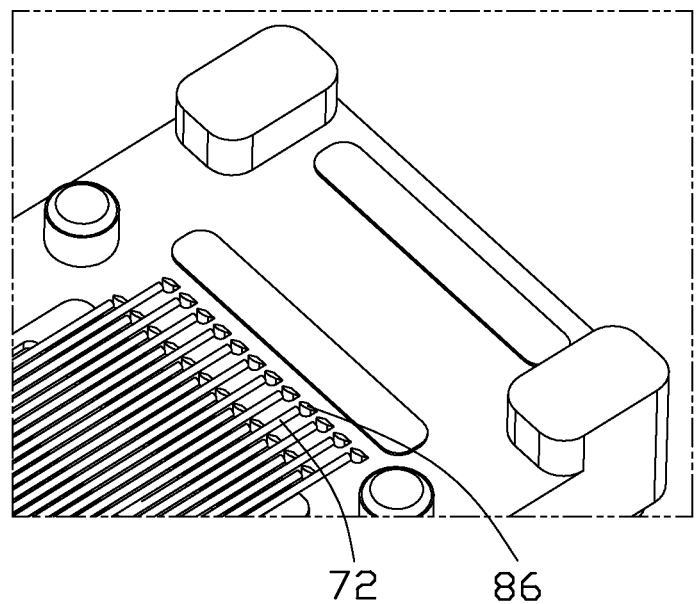
FIG. 21(B) is a perspective view to show how the fibers and the corresponding lenses are aligned with each other.
Figure 21C:
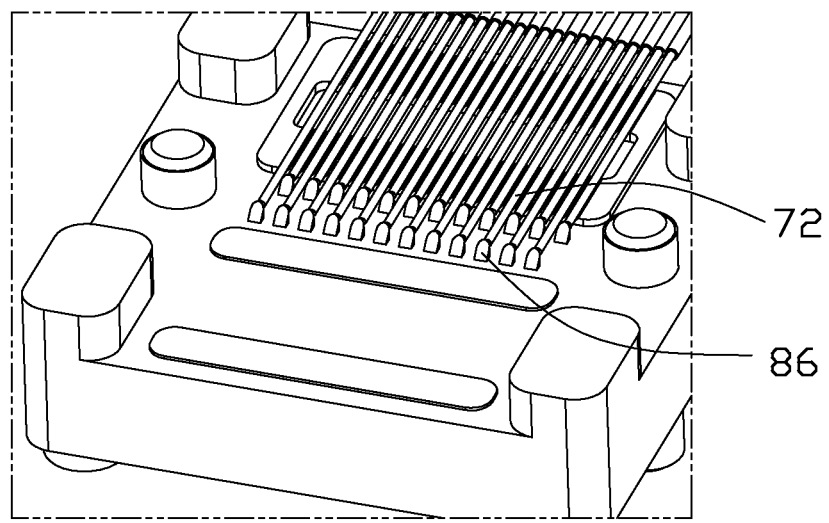
FIG. 21(C) is another perspective view to show how the fibers and the corresponding lenses are aligned with each other.
Figure 22:
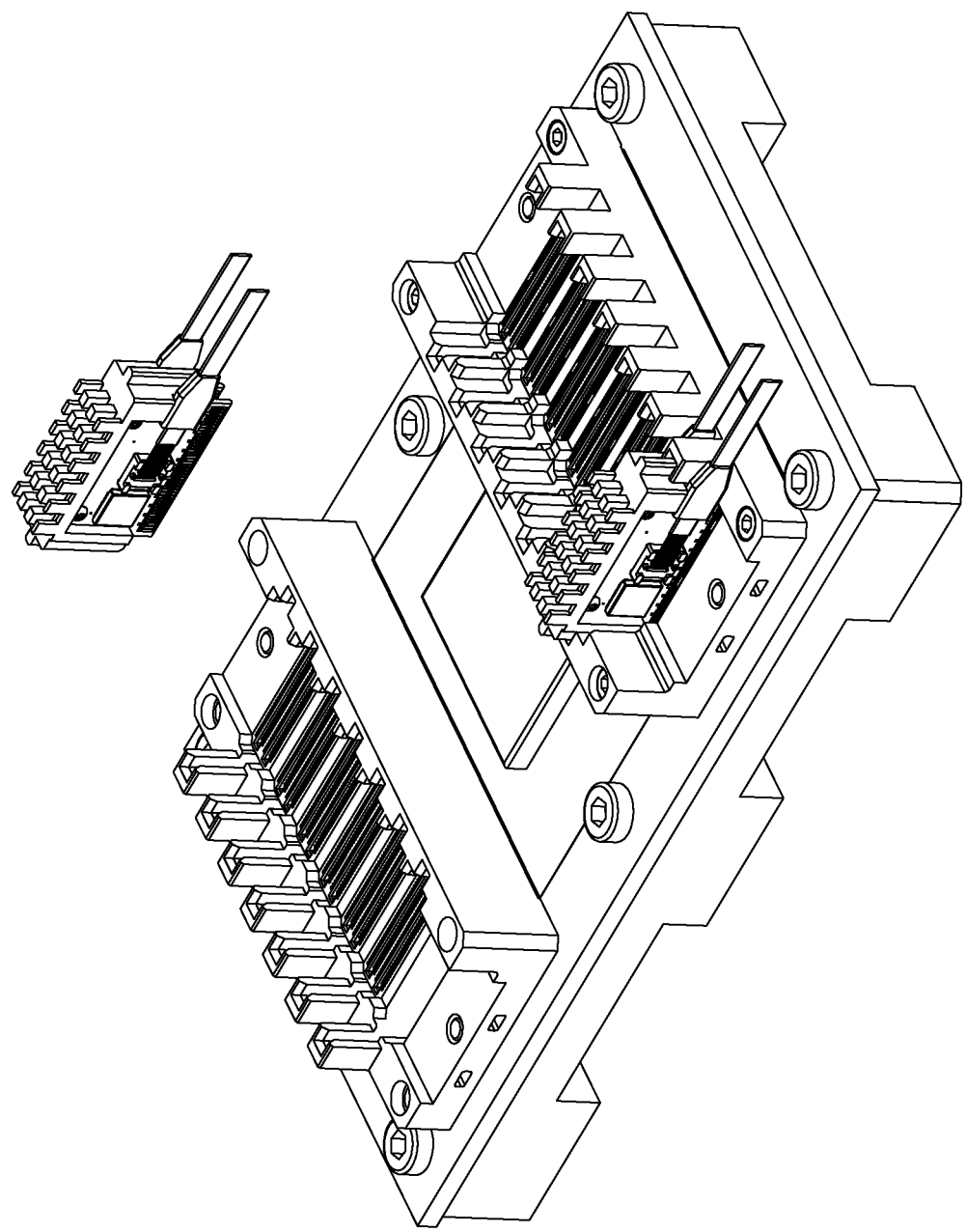
FIG. 22 is a perspective view to show how the SLC or AOC modules are assembled to the corresponding connectors in the organizer.
Figure 23:
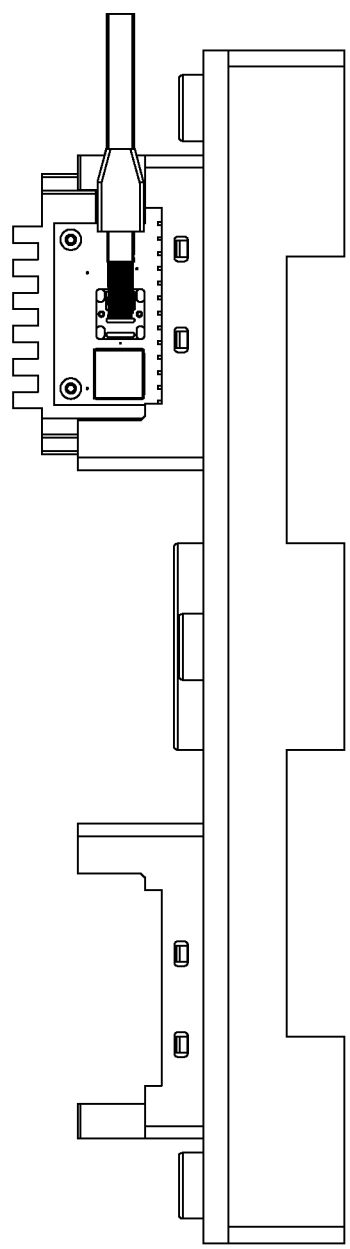
FIG. 23 is an elevational view to show how the SLC or AOC module is assembled to the corresponding connector in the organizer.
Figure 24:
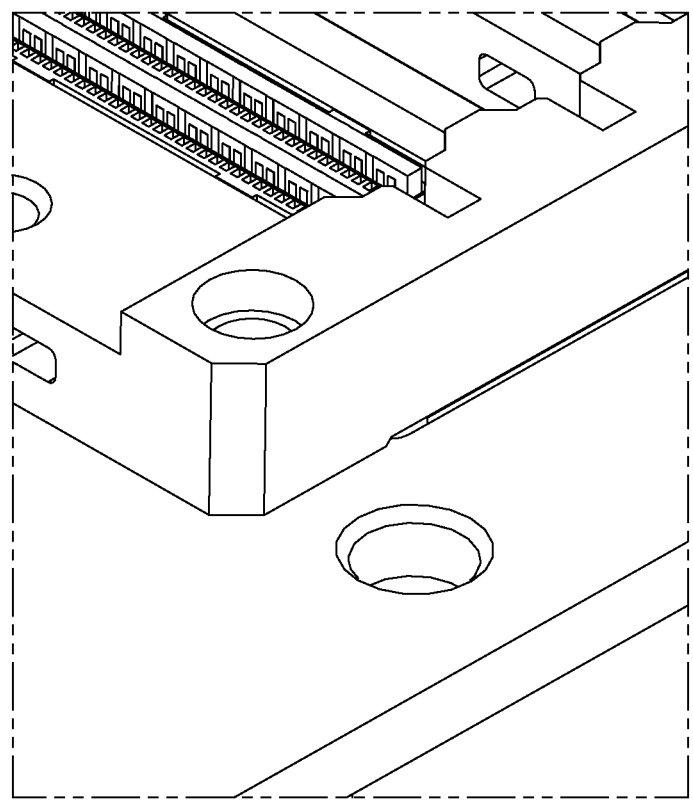
FIG. 24 is a partial perspective view to show the organizer and the associated connectors are commonly mounted upon the substrate to be test via plug cards.

Referring FIGS. 1-24, an aluminum frame 10 defines a ceramic substrate receiving area to receive a ceramic substrate 12 therein. The ceramic substrate 12 defines two connector areas 14, on two opposite ends in a longitudinal direction, forming LGA (Land Grid Array) pads 16 thereon. A modular SLC (Surface Laminar Circuit) interconnect system 18 is fastened to the aluminum frame 10 around each of the connector areas 14, and includes an aluminum organizer 20 defining a plurality of elongated cavities 22 in a transverse direction perpendicular to the longitudinal direction while each of the cavities 22 extends along the longitudinal direction. The aluminum organizer 20 defines a plurality of fastening holes 24 and a plurality of locating holes 26 to receive corresponding screws 28 and dowel pins 30 for locating and fastening the organizer 20 upon the aluminum frame 10. The organizer 20 further includes a pair of tower structures 32 on two lateral sides in the transverse direction to commonly defines plural pairs of vertical guide channels 34. A plurality of card edge connectors 36 are respectively disposed in the corresponding cavities 22. The cavity 22 is configured to allow the connector 36 to be assembled thereinto in only an upper direction.

Each connector 36 includes an insulative housing 38 defines a pair of card receiving slots 40 in the transverse direction while each card receiving slot 40 extends along the longitudinal direction. A plurality of passageways 42 are formed in the housing 38 and by two sides of the corresponding card receiving slot 40 in a staggered manner along the transverse direction. A plurality of contacts 44 are disposed in the corresponding passageways 42, respectively. Each contact 44 includes an upper contacting section 46 extending into the corresponding card receiving slot 40, a middle retaining section 48 retained to the housing 38, and a lower tail section 50 for contacting the corresponding LGA pad 16 wherein in a side view the upper contacting sections 46 of the contacts 44 which share the same card receiving slot 40, are symmetrically arranged with each other while the lower tail sections 50 of the contacts 44 sharing the same card receiving slot 40 are arranged same with each other but commonly symmetrically arranged with the lower tail sections of the contacts sharing the other card receiving slot 40. It is noted that the distance or pitch between the pair of card receiving slots 40 is 3.0 mm for compliance with the traditional SLC to SLC arrangement, and the pitch between the adjacent two contacts on the same side is 0.6 mm.

A plurality of SLC or AOC modules 60 are assembled to the organizer 20 and the associated connectors 36, respectively. Each SLC module 60 includes two opposite SLC or AOC assemblies 62 each comprising an SLC board 63 capable of transmission of twelve pairs Tx and twelve pairs Rx with 0.6 mm pitch thereof, two micro-controllers, two OE glass lenses, four Tx and Rx IC chips, a pair of OE cable assembly 66, and a single heat sink 64 to which both two SLC assemblies 62 are commonly assembled via mounting screws 59. The heat sink 64 defines a pair of opposite guide rails 61 respectively received in the corresponding guide channels 34, respectively.

The pair of OE cable assemblies 66 are respectively connected to the corresponding SLC board 63. Each OE cable assembly 66 includes a molded lens mechanism 68 and a fiber cable part 70. The fiber cable part 70 includes a plurality of fibers 72 with reduced cladding of 125 μm pitch, enclosed in a strain relief 74. The molded lens mechanism 68 includes a base 76 defining a mounting face 78 for mounting to the SLC assembly 62 and a connecting face 80 opposite to the mounting face 78 for connecting with the fiber cable part 70. A pair of mounting posts 82 are formed on the mounting face 78 for extending into a pair of corresponding through holes 65 in the SLC board 63. A plurality of V-grooves 84 are formed in the connecting face 80 for receiving the corresponding fibers 72, respectively, and a plurality of lens structures 86 arranged in two staggered rows, are formed on the connecting face 80 in alignment with the V-groves 84, respectively, so as to be coupled with the corresponding fibers 72 for transmitting light to the corresponding OE glass lenses on the SLC assembly 62.

When assembled, for each SLC module 60, each OE cable assembly 66 is assembled to the corresponding SLC board 63. The SLC board 63 with the corresponding circuit pads around a bottom edge region, is inserted into the corresponding card received slot 40 at the bottom while assembled to the heat sink 64 via mounting screws 59. The heat sink 64 is assembled to the organizer 20 via engagement between the guide rails 61 of the heat sink 64 and the guide channels 34 of the organizer 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the fin structures may use different material from the overmold case for better heat transfer for efficiently lowering temperature.

What is claimed is:

1. An SLC (Surface Laminar Circuit) interconnection system assembly comprising:
   an organizer defining a plurality of cavities side by side arranged with one another in a transverse direction while each of the cavities extending along a longitudinal direction perpendicular to said transverse direction;
   a plurality of connectors disposed in the corresponding cavities, respectively, each of said connector including an insulative housing with at least one card receiving slot extending along the longitudinal direction, a plurality of contacts disposed in the housing with contacting sections extending into the card receiving slot;
   a plurality of SLC modules each including at least one SLC board received in the corresponding connector, and an OE cable assembly defining a plurality of optic fibers transmitting light with the SLC board via lens mechanism.

2. The SLC interconnection system assembly as claimed in claim 1, wherein the connectors are located upon a base plane, and the SLC boards are perpendicular to said plane.

3. The SLC interconnection system assembly as claimed in claim 2, wherein the plurality of optic fibers are arranged side by side along a plane parallel to the corresponding SLC board while perpendicular to the base plane.

4. The SLC interconnection system assembly as claimed in claim 1, wherein each of said SLC modules further includes a heat sink cooperating with the corresponding connector to sandwich the corresponding SLC board therebetween in a vertical direction perpendicular to both said longitudinal direction and said transverse direction.

5. The SLC interconnection system assembly as claimed in claim 4, wherein an interengaging structures are formed on said heat sink and the organizer to assemble both together.

6. The SLC interconnection system assembly as claimed in claim 5, wherein said interengaging structures only allow the heat sink to be assembled to the organizer downwardly in the vertical direction.

7. The SLC interconnection system assembly as claimed in claim 1, wherein the organizer is configured to allow the corresponding connectors to be upwardly assembled into the corresponding cavities, respectively, in a vertical direction perpendicular to both said transverse direction and said longitudinal direction.

8. The SLC interconnection system assembly as claimed in claim 1, wherein the lens mechanism is equipped with the lens structures and a fiber holding structures to align the corresponding fibers with the lens.

9. The SLC interconnection system assembly as claimed in claim 8, wherein the lens structures are arranged in two front ad rear rows while in a staggered manner so that some fibers coupled with the lens structures in a rear row pass the lens structures in a front row.

10. An SLC (Surface Laminar Circuit) interconnection assembly comprising:
    an SLC module including two SLC assembly parallel to each other, each SLC assembly including an SLC board and a corresponding OE (Opto-Electronic) cable assembly, said SLC board having a plurality of circuit pads on a bottom edge region, said OE cable assembly defining a molded lens mechanism and an optical waveguide part, said lens mechanism including a base, which is mounted upon the SLC board and a plurality of lens structures lined in a transverse direction, said optical wave guide part defining a plurality of optical channels each aligned with one of the lens structures in a front-to-back direction perpendicular to said transverse direction, respectively;
    an electrical connector defining a corresponding slot receiving the bottom edge region of the SLC board; and
    a heat sink to which said SLC assembly is attached, wherein
    said heat sink is adapted to be fixed to a substrate on which the SLC assembly is mounted.

11. The SLC interconnection assembly as claimed in claim 10, wherein said connector defines two slots respectively to receive the SLC boards of said SLC module.

12. The SLC interconnection assembly as claimed in claim 11, wherein said heat sink defines guide rails assembled into corresponding guide channels of an organizer in which said connector is received.

13. The SLC interconnection assembly as claimed in claim 12, wherein said SLC boards each with the associated OE cable assembly are arranged in an opposite manner with each other.

14. The SLC interconnection assembly as claimed in claim 10, wherein said slot extends along said front-to-back direction.

15. The SLC interconnection assembly as claimed in claim 10, further including an organizer which is adapted to be mounted onto the substrate also, wherein the heat sink interengages with the organizer thereby being fixed to the substrate.

16. An SLC (Surface Laminar Circuit) interconnection assembly comprising:
    an SLC module including at least one SLC assembly each including an SLC board and a corresponding OE (Opto-Electronic) cable assembly, said OE cable assembly defining a molded lens mechanism and a fiber cable part, said lens mechanism including a base, which is mounted upon the SLC board and equipped with a plurality of grooves totally in a transverse direction while each extending along a front-to-back direction perpendicular to said transverse direction, and a plurality of lens structures aligned with said grooves in the front-to-back direction, respectively, said fiber cable part defining a plurality of optical fibers received in the corresponding grooves, respectively;
    a unitary heat sink assembled to said at least one SLC assemblies; and
    an electrical connector defining at least one slot to receive bottom edge regions of the SLC boards of said SLC assembly opposite to the heat sink in a vertical direction parallel to said transverse direction.

17. The SLC interconnection assembly as claimed in claim 16, wherein said heat sink defines a first guiding device interengaged with a second guiding device of the electrical connector.

18. The SLC interconnection assembly as claimed in claim 16, wherein said SLC module further includes another SLC assembly same with said SLC assembly but in an opposite manner, and both said heat sink and said connector are coupled to said another SLC assembly.

* * * * *